United States Patent
Harris et al.

(10) Patent No.: US 8,331,394 B2
(45) Date of Patent: Dec. 11, 2012

(54) INCREASING SCHEDULING REQUEST EFFICIENCY IN A WIRELESS COMMUNICATION SYSTEM

(75) Inventors: John M. Harris, Glenview, IL (US); William N. Shores, Phoenix, AZ (US); Hua Xu, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 240 days.

(21) Appl. No.: 12/972,716

(22) Filed: Dec. 20, 2010

(65) Prior Publication Data

US 2011/0199991 A1   Aug. 18, 2011

Related U.S. Application Data

(60) Provisional application No. 61/304,855, filed on Feb. 16, 2010.

(51) Int. Cl.
*H04J 4/00* (2006.01)
(52) U.S. Cl. .................................................. 370/436
(58) Field of Classification Search .................. None
See application file for complete search history.

(56) References Cited

U.S. PATENT DOCUMENTS

| | | | |
|---|---|---|---|
| 7,778,151 B2 * | 8/2010 | Bertrand et al. | 370/208 |
| 2010/0098011 A1 * | 4/2010 | Pelletier et al. | 370/329 |
| 2011/0019628 A1 * | 1/2011 | Tseng | 370/329 |

* cited by examiner

*Primary Examiner* — Anh-Vu Ly

(57) ABSTRACT

An apparatus and method for increasing Scheduling Request efficiency in a wireless communication system includes a step 400 of configuring periodic timing opportunities for sending the scheduling request. A next step 402 includes detecting new data arriving in an empty queue to trigger a scheduling request. A next step 406 includes sending a scheduling request at selected SR opportunities until a response to the scheduling request is generated.

5 Claims, 4 Drawing Sheets

INCREASING SCHEDULING REQUEST EFFICIENCY IN A WIRELESS COMMUNICATION SYSTEM

TECHNICAL FIELD OF THE INVENTION

This invention relates generally to wireless communication systems and more particularly to increasing Scheduling Request efficiency in a wireless communication system.

BACKGROUND OF THE INVENTION

Currently 3rd generation (3G) cellular communication systems based on Code Division Multiple Access (CDMA) technology, such as the Universal Mobile Telecommunication System (UMTS) or 4G Long Term Evolution (LTE), are being deployed in order to accommodate the needs of various users. For example, an evolved NodeB (eNB) may be deployed in order to serve many diverse user equipment (UE) having different communication requirements. Of course, quality of service for a UE is an important consideration, including meeting delay requirements and providing priority service for preferred users. In order to accommodate these different needs, it is important to efficiently handle Scheduling Requests (SR) from user equipment.

At present for LTE protocols, when a user equipment has new data in an empty queue for all of its four logical channel groups (LCG), and SR is triggered such that the UE is required to send a Scheduling Request (SR) for this new data to its serving eNB and repeat the SR at each subsequent SR opportunity up to a maximum number of SR repetitions, or until the UE receives an uplink grant for the new data from the eNB. It should be noted that there are no exact rules for what can or cannot trigger an SR. In the above example, an SR is triggered when data arrives to any of the LCG's when all of the LCG's are empty. Another typical scenario is when data arrives to an empty LCG & there is no currently pending higher priority LCG data. It should be recognized that there are other SR triggers also, any or all of which being applicable for the present invention.

At present, the SR opportunity interval has a configurable period. However, longer SR intervals are possible. In general, SR reliability is believed to be about 99%. In other words, the first SR sent by the UE most probably is received properly by the eNB, and there is really no urgent need to keep sending SRs, which wastes resources.

One solution to the problem is for the eNB to ignore the next k SRs from the UE after the first SR is received from the UE, where k is some positive integer, e.g. k=1. However, as the UE is still sending SRs, this still wastes processing power, air interface resources, and could incur some RF interference from the repeated SRs. Another solution to the problem is for the eNB to accept all SRs from the UE. However, this risks generating two or more separate uplink grants in response to the same SR trigger (e.g. new data arrival) from the UE, which wastes Physical Downlink Control Channel (PDCCH) resources.

In an additional consideration, the eNB can receive an SR from a UE without yet receiving a subsequent Buffer Status Report (BSR) from the UE. The BSR identifies the priority and delay requirements of the new data. Without this BSR information, the eNB has difficulty meeting the delay requirements of different services, while not wasting capacity over assigning resources. For example, if the eNB does not yet have the BSR information, it will not know how much data a UE wishes to transmit or its priority, and the eNB will end up over granting resources that may not be needed for low priority data, resulting in delayed communications for other UEs. This could also waste PDCCH/PUSCH (Physical Uplink Shared Channel) resources, giving overly high priority to uplink grants for low priority data.

What is needed is a technique for increasing SR efficiency without wasting resources.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

Skilled artisans will appreciate that common but well-understood elements that are useful or necessary in a commercially feasible embodiment are typically not depicted in order to facilitate a less obstructed view of these various embodiments of the present invention.

DETAILED DESCRIPTION OF THE PREFERRED EMBODIMENT

The present invention provides a technique for increasing SR efficiency without wasting resources. In particular, the present invention avoids processing and capacity waste associated with redundant SRs, especially when triggered by lower priority traffic, by skipping SRs in particular circumstances. In this way, the present invention avoids wasting capacity through redundant PDCCH grants.

The following description focuses on embodiments of the invention applicable to a CDMA cellular communication system and in particular to a $4^{th}$ Generation cellular communication system such as a Long Term Evolution (LTE) and WiMAX or a 3rd Generation Cellular communication system such as a High Speed Packet Access (HSPA) UMTS System. However, it will be appreciated that the invention is not limited to these applications but may be applied to many other cellular communication systems. Also, the description will focus on scenarios of a serving evolved NodeB (eNB) and a served UE. However, it will be appreciated that the described principles apply equally to other hierarchical scenarios.

Figure 1:
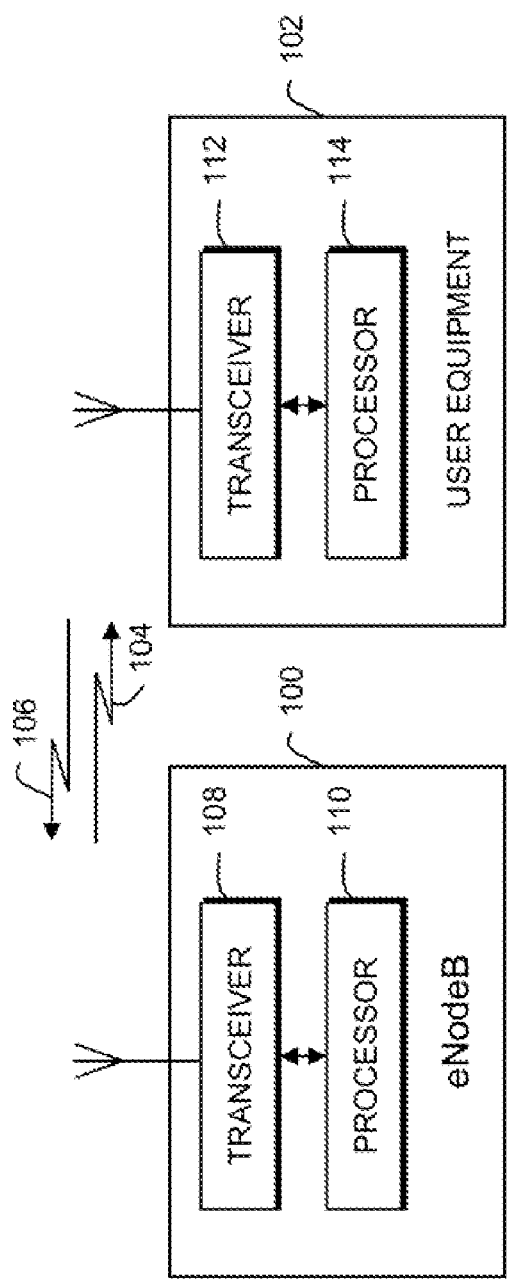
FIG. 1 illustrates a communication apparatus, in accordance with a first embodiment of the present invention.

FIG. 1 illustrates an example of a wireless cellular communication system, which in this specific example is a 4G LTE cellular communication system. A serving eNB 100 is able to communicate with at least one served UE 102. The serving eNB 100 includes a processor 110 and transceiver 108. The served user equipment 102 also includes a processor 114 and transceiver 112. In this example, the processor 114 of the UE 102 has new data that it wants to upload to the eNB 100, thereby triggering the need for an SR from the UE. The UE 102 sends the SR to the eNB 100 in a first SR period in order to schedule resources for the new data on an uplink to the eNB 100 through its transceiver 112. The processor 110 of the eNB 100 responds to the SR by sending an uplink (UL) grant 104 via its transceiver 108 that assigns the UE specific uplink frames/region for its transmissions. However, without knowing the amount of data or its priority (e.g. from a BSR from the UE), the processor of the eNB 100 will then not know how much uplink resources to schedule for the UE's new data transmissions, and therefore the eNB can only overgrant an uplink schedule for the UE's uplink data in order to minimize the possibility of losing the data. Alternatively, the processor 110 of the eNB 100 could fail to send an UL grant to the UE, for various reasons, which prompts the UE to repeat the same SR in subsequent SR opportunities until it receives a response from the eNB.

Figure 2:
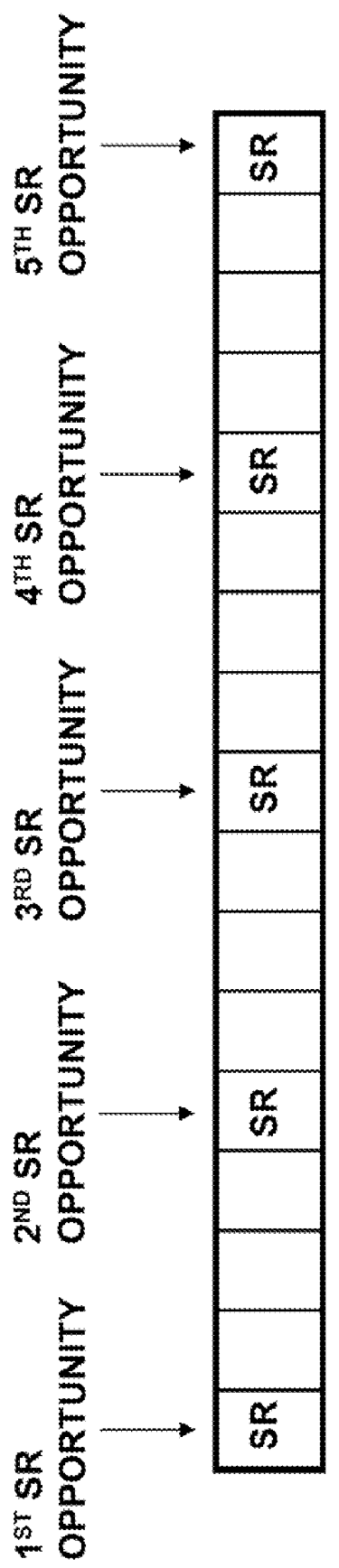
FIG. 2 is a graphical representation of timing, in accordance with one embodiment of the present invention.

Referring to FIG. 2, a set of seventeen transmission time intervals (TTI) is shown. In this embodiment the Scheduling Request/Scheduling Request Indicator timing opportunities for the UE are configured for every fourth TTI. Of course, it should be recognized that this is an example only, and that other periods can be used. In addition, these periods can be dynamically changed. Typically, TTIs can occur every 0.5 to 1.0 millisecond, and SR opportunities can be at 5 millisecond or higher intervals.

The UE is configured with periodic timing opportunities for sending the scheduling request, in this case every fourth TTI, i.e. there are 1/N SR opportunities, where N equals four. When a UE detects new data arriving in an empty queue (e.g. all of its logical channel groups are empty), this will trigger a scheduling request and trigger the UE to transmit its scheduling request to its serving eNB on the next subsequent SR opportunity. In the prior art, the UE will then send the scheduling request to its serving eNB at the next, and then every subsequent SR opportunity until a response to the scheduling request, such as an uplink grant, is generated or some maximum number of SR transmissions is reached. However, in the present invention, the UE skips or is prohibited from transmitting on certain subsequent SR opportunities, sending the SR at only selected SR opportunities, such as non-consecutive subset of the SR opportunities, for example. As long as the SR is pending the UE will instruct the physical layer to signal SR on the PUCCH at the selected SR opportunities, up to some maximum number of SR transmissions, as will be further explained below.

In a first embodiment, the UE sends the SR once, at the first TTI where there is an SR opportunity after the SR is triggered. Generally, since SRs are 99% reliable, it will be assumed that the eNB has properly received the first and only SR, and will respond when it can. This minimizes PUCCH usage.

In a second embodiment, the UE will instruct the physical layer to signal SR on PUCCH on every odd-numbered SR opportunity, after the SR is triggered. Therefore the SR is sent on every other SR opportunity, i.e. the $1^{st}$, $3^{rd}$, $5^{th}$ . . . SR opportunity after the SR is triggered, until an UL grant is received from the serving eNB or a maximum number of SR transmissions is reached. This reduces PUCCH usage.

In a third embodiment, the UE will instruct the physical layer to signal SR on PUCCH on every $X^{th}$ SR opportunity, after the SR is triggered. Note that the units or timing of the SR opportunities are typically denoted with respect to specific TTIs. In the example of the second embodiment, X is two. However, in this embodiment the SR is sent on every fourth SR opportunity, i.e. the $1^{st}$, $5^{th}$, $9^{th}$ . . . SR opportunity, until an UL grant is received from the serving eNB, or a maximum number of SR transmissions is reached. This further reduces PUCCH usage.

In a fourth embodiment, the UE will instruct the physical layer to signal SR on the first TTI where there is an SR opportunity after the SR is triggered. In addition, the UE will instruct the physical layer to signal the SR on the PUCCH on every $Y^{th}$ subsequent SR opportunity. In this case, subsequent means the SR opportunities to occur next after the initial SR transmission. In the example shown in FIG. 2, if Y is two, the SR is sent on every other SR opportunity, i.e. the $1^{st}$, $3^{rd}$, $5^{th}$ . . . SR opportunity, similar to the third embodiment, until an UL grant is received from the serving eNB (or equivalently the SR is prohibited from being transmitted on all but every $Y^{th}$ SR opportunity subsequent to the initial SR transmission after the SR is triggered).

Optionally, Y can be chosen to be one more than the LCG number of high priority pending data. For example, the four LCGs are typically assigned numbers zero through three, in order of data priority. Therefore, LCG 0 is the highest priority and LCG 3 is the lowest priority. For highest priority data, Y will be LCG 0+1, or Y=1. In this case, every Y SR opportunity, $1^{st}$, $2^{nd}$, $3^{rd}$ . . . , will be used to send the SR for this highest priority data. For the next highest priority data, Y will be LCG 1+1, or Y=2. In this case, every second SR opportunity, $1^{st}$, $3^{rd}$, $5^{th}$ . . . , will be used to send the SR for this next highest priority data. For the next highest priority data, Y will be LCG 2+1, or Y=3. In this case, every third SR opportunity, $1^{st}$, $4^{th}$, $7^{th}$ . . . , will be used to send the SR for this next highest priority data. For the lowest priority data, Y will be LCG 3+1, or Y=4. In this case, every fourth SR opportunity, $1^{st}$, $5^{th}$, $9^{th}$ . . . , will be used to send the SR for this lowest priority data. In this way, less PUCCH resources are used for lower priority data. Further, Y can be decremented (if Y≠1) for data that has been waiting in queue too long, thereby effectively raising its priority. For example, Y=Y−1 if data has been queued for more than half of an SRI interval before the first SR was transmitted.

Figure 3:
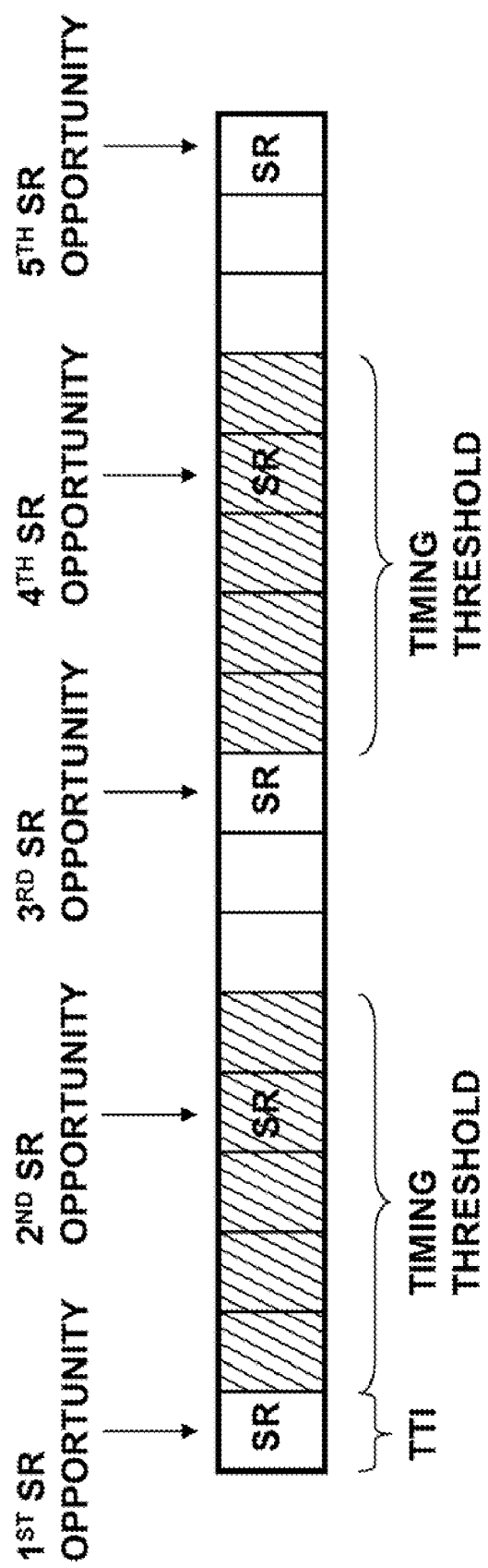
FIG. 3 is a graphical representation of timing, in accordance with another embodiment of the present invention.

In a fifth embodiment, referring to FIG. 3, the UE will instruct the physical layer to not signal SR on PUCCH on any value of X (or Y=1) less than a predetermined timing threshold, e.g. >10 milliseconds after the initial SR transmission after the SR was triggered. In the example shown, if X=1, but the timing threshold is five TTIs, the SR can be sent at the $1^{st}$, $3^{rd}$, $5^{th}$ . . . SR opportunity, each opportunity separated by a time period greater than the predetermined threshold. Similarly, if Y=1, and the timing threshold is five TTIs, the SR can be sent at, i.e. the $1^{st}$, $3^{rd}$, $5^{th}$ . . . SR opportunity. In more broad terms, this embodiment will skip fewer SR opportunities the longer the SR interval is.

In a sixth embodiment, where SRs are not skipped by the UE, i.e. the UE sends consecutive or immediately subsequent SRs, and the eNB can choose to skip or ignore the immediate next (i.e. back to back) SR opportunity immediately after receiving a valid SR. Optionally, the eNB can ignore any additional SRs received within a certain minimum time period after receiving a valid SR. The eNB may choose to implement this embodiment, for example, to discount repeated SRs where the communication system is congested.

Figure 4:
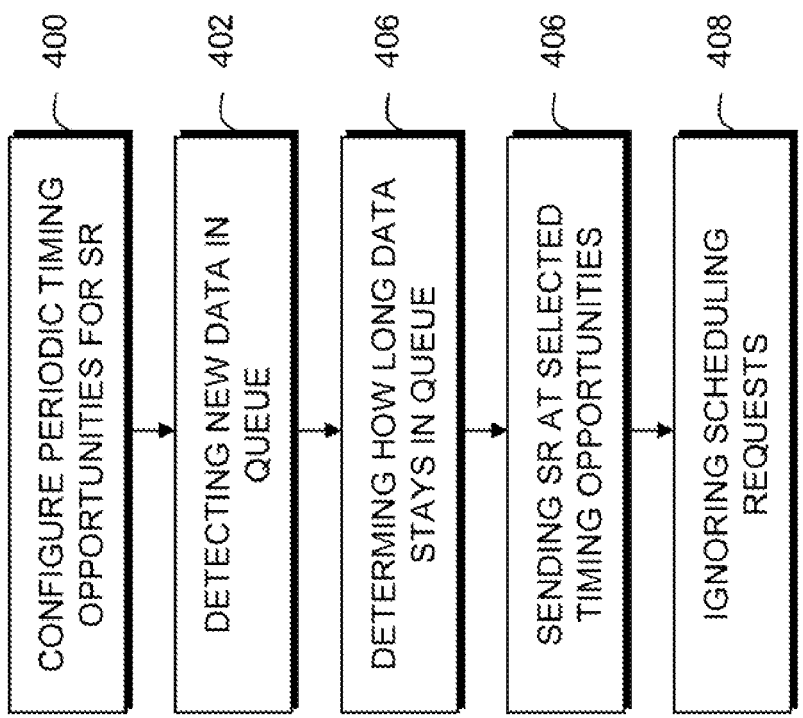
FIG. 4 illustrates a flow chart for a method, in accordance with the present invention.

Referring to FIG. 4, the present invention also provides a method for increasing Scheduling Request efficiency in a wireless communication system. The method includes a step 400 of configuring periodic timing opportunities for sending the scheduling request. Preferably, the configuration is performed by the eNB and sent to the UE to be configured.

A next step 402 includes the UE detecting new data arriving in an empty queue to trigger a scheduling request.

A next step 404 includes the UE determining how long the new data remains in the queue.

A next step 406 includes the UE sending a scheduling request to be received by a serving eNB at selected SR opportunities until an SR exit condition is met. In particular, SR opportunities can be skipped such that the scheduling request is sent at non-consecutive SR opportunities. In practice, the selected SR opportunities can be configured in the UE or pre-configured in the eNB and sent to the UE. The SR exit condition can be any of; receiving an uplink grant from the serving eNB, an expiry of a timer, reaching a maximum number of scheduling request transmissions, and triggering a Buffer Status Report since the last transmission of a Buffer Status Report.

In the first embodiment, the sending step 406 includes sending the scheduling request in only a first transmission time interval.

In the second embodiment, the sending step 406 includes sending the scheduling request at every odd-numbered transmission time interval.

In the third embodiment, the sending step 406 includes sending the scheduling request at every $X^{th}$ transmission time interval.

In the fourth embodiment, the sending step 406 includes sending the scheduling request at every $Y^{th}$ SR opportunity. Optionally, Y−1 is a logical channel group number of the new data. Further, if it is known how long the data has been in queue (from step 404) then the sending step includes sending the scheduling request at more frequent SR opportunities the longer the new data remains in queue. In particular, Y can be decremented by 1, if possible, for new data that has been queued for more than half of a periodic timing opportunity before the first scheduling request is sent.

In the fifth embodiment, the timing between sending scheduling requests is greater than a predetermined threshold. In particular, a timing of the selected timing opportunities is inversely proportional to the configured period of the periodic timing opportunities.

The sixth embodiment includes a further step 408 of the eNB ignoring some scheduling requests in response to congestion or data priority.

The present invention provides the advantage of enhancing the performance capacity of a communication system pursuant to the above embodiments. Notwithstanding the stated benefits, the embodiments described herein can be realized with only minimal changes to the relevant 3GPP, 3GPP2, and 802.16 standards. It will be understood that the terms and expressions used herein have the ordinary meaning as is accorded to such terms and expressions by persons skilled in the field of the invention as set forth above except where specific meanings have otherwise been set forth herein.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including use of hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

While the invention may be susceptible to various modifications and alternative forms, a specific embodiment has been shown by way of example in the drawings and has been described in detail herein. However, it should be understood that the invention is not intended to be limited to the particular forms disclosed, and can be applied equally well to any communication system that can use real-time services. Rather, the invention is to cover all modification, equivalents and alternatives falling within the scope of the invention as defined by the following appended claims.

What is claimed is:

1. A method for increasing Scheduling Request ("SR") efficiency in a wireless communication system, the method comprising the steps of:
   being configured with periodic timing opportunities for sending a scheduling request;
   detecting new data arriving in an empty queue to trigger a scheduling request; and
   sending a scheduling request at a next scheduling request opportunity and selected subsequent scheduling request opportunities until an SR exit condition is met;
   wherein the sending step includes sending the scheduling request at every Yth SR opportunity, wherein Y is an integer;
   wherein Y−1 is a logical channel group number of the new data; and
   wherein Y is decremented by 1, if possible, for new data that has been queued for more than half of a periodic timing opportunity before a first scheduling request is sent.

2. The method of claim 1, wherein the SR exit condition is receiving an uplink grant.

3. The method of claim 1, wherein the SR exit condition is an expiry of a timer.

4. The method of claim 1, wherein the SR exit condition is reaching a maximum number of scheduling request transmissions.

5. The method of claim 1, wherein the SR exit condition is triggering a Buffer Status Report since the last transmission of a Buffer Status Report.

* * * * *